(12) United States Patent
Kreuzer et al.

(10) Patent No.: US 6,250,674 B1
(45) Date of Patent: *Jun. 26, 2001

(54) HEAT-RESISTANT AIRBAG TEXTILE

(75) Inventors: Martin Kreuzer, Kleinwallstadt; Ralph Neupert, Aschaffenburg, both of (DE)

(73) Assignee: TRW Automotive Safetysystems GmbH (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,354

(22) Filed: Jul. 24, 1998

(30) Foreign Application Priority Data

Jul. 24, 1997 (DE) .............................. 197 31 797

(51) Int. Cl.[7] ............................................. B60R 21/16
(52) U.S. Cl. ................................... 280/743.1; 280/728.1
(58) Field of Search .............................. 280/743.1, 728.1

(56) References Cited

FOREIGN PATENT DOCUMENTS

| | | |
|---|---|---|
| 31 08 604 A1 | 8/1982 | (DE) . |
| 40 31 325 A1 | 4/1991 | (DE) . |
| 43 08 871 A1 | 9/1994 | (DE) . |
| 43 21 311 A1 | 1/1995 | (DE) . |
| 44 23 823 A1 | 1/1995 | (DE) . |
| 195 17 911 A1 | 11/1996 | (DE) . |

OTHER PUBLICATIONS

Technische Textilien, 37. Jgg., Jul./Aug. 1994, T 86.

Primary Examiner—Eric Culbreth
(74) Attorney, Agent, or Firm—Chadbourne & Parke LLP

(57) ABSTRACT

An airbag for vehicle-passenger protection devices that inflates rapidly in response to pyrotechnically generated gases and optionally to gases released from a compressed-gas cylinder is made at least to some extent of a textile or knit with a surface that carbonizes when exposed to hot gases. The carbonizing material also improves the airbag's resistance to total combustion by at least 20 percent without additional expense.

6 Claims, 1 Drawing Sheet

HEAT-RESISTANT AIRBAG TEXTILE

BACKGROUND OF THE INVENTION

The present invention concerns an airbag for vehicle-passenger protection devices that inflates rapidly in response to pyrotechnically generated gases and optionally to gases released from a compressed-gas cylinder. Airbags are now almost always made of polyamides or polyesters optionally coated at least to some extent with neoprene or silicon to protect the textile from the hot gases inflating the bag. Many manufacturers, instead of coating the critical areas of the textile, just add extra layers, which are intended to be sacrificed in defense of the main layer on the outside. Both measures—sacrificial layers of textile plus coats of neoprene or silicon—are sometimes also resorted to.

Gas generators or hybrids, that inflate airbags with a mixture of a pyrotechnically generated hot gas and a gas released from a cylinder that simultaneously cools, usually do not make it necessary to protect the airbag's textile from heat because the generators are designed to combine the hot and cool gases before they enter the bag thoroughly enough that the temperature of the mixture cannot threaten the textile. If a thorough enough mixture cannot be ensured, however, the bag's intake will be exposed to damage even from a hybrid generator.

Gas generators now employ azide-free propellants for various reasons. Such materials require higher ignition temperatures and accordingly release hotter gases.

Protecting airbag textiles from heat is accordingly becoming increasingly important if the advantages of azide-free propellants are still to be exploited.

Since the known and relevant methods of protection are all relatively expensive and complicated, there is a real need for simpler and cheaper but just as effective approaches.

SUMMARY OF THE INVENTION

This object is attained in accordance with the present invention by making the airbag at least to some extent of a textile or knit with a surface that carbonizes when exposed to hot gases.

DETAILED DESCRIPTION OF THE INVENTION

The theory is that carbonizing the surface of a polyamide or polyester fiber will allow it to protect itself against heat, in that the carbonized layer will conduct much less heat than the uncarbonized material would, and that the chemically converted portion will in turn protect the rest of the fabric.

The effect of carbonization can be measured by subjecting a defined area of the fabric to flames to produce the chemical reaction. A heated sphere of known mass and diameter is then employed to determine how long the treated area will resist melting as compared to an area that has not been treated in accordance with the present invention. The difference in melting time represents the extent of improvement in the heat resistance of the carbonized fabric.

Surface carbonization can be facilitated by using a textile or knit of fibers with a solid spun core with fluffy monofilaments extending out of it. The fluff will provide an extensive surface to the heat and accordingly rapidly convert to a carbonized state that will protect the rest of the fabric. Since such materials are not especially more expensive to produce than the smooth fibers heretofore employed, the intended defense against heat can be attained without much additional investment. It is not important when such fibers are employed to precisely determine the especially threatened areas in that the airbag as a whole will be protected from heat and not just the critical areas.

It is of course alternatively possible to carbonize only the critical vicinities of the intake, in which case of course the areas will need to be defined ahead of time.

Figure 1:
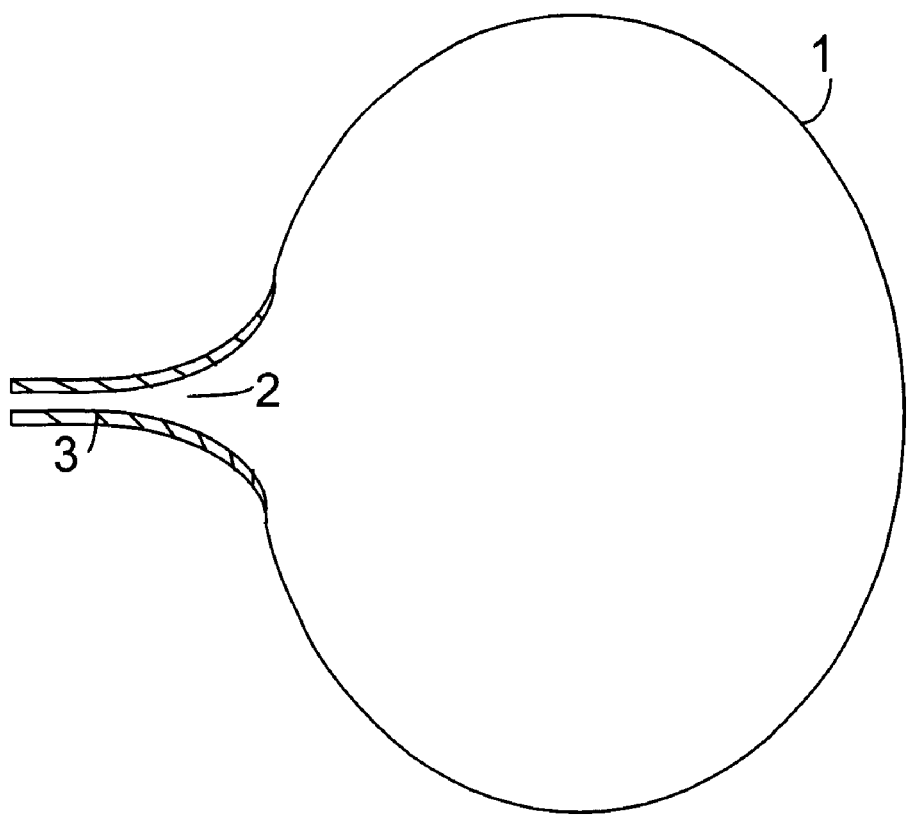
FIG. 1 schematically shows an airbag according to the present invention.
Figure 2:
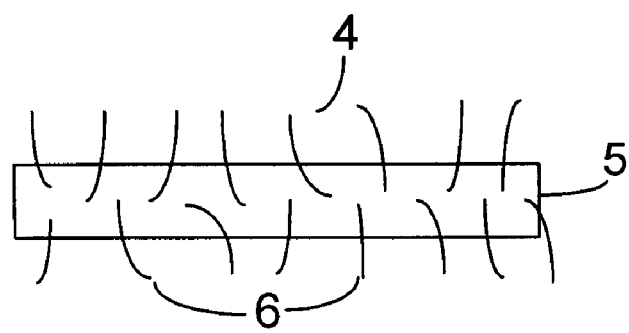
FIG. 2 schematically shows a textile or knit used in accordance with the invention.

As shown in FIG. 1, the airbag 1, in the vicinity of the hot gas intake 2, is coated with a textile or knit 3 with a surface that carbonizes. The textile or knit, as shown in FIG. 2, is made entirely of fibers 4 with a solid spun core 5 with fluffy monofilaments 6, constituting the part that carbonizes, extending out of it.

The effects of carbonization can also be obtained in the airbag material or its coating by introducing just some carbonized fibers into the textile or knit. A carbonizing non-woven can also be employed since there is no particular reason to ensure against tears.

Materials that carbonize will also improve an airbag's resistance to total combustion by at least 20 percent.

What is claimed is:

1. An airbag for vehicle-passenger protection devices that inflates rapidly in response to pyrotechnically generated gases wherein the airbag is composed at least to some extent of a textile or knit with a surface that has been carbonized by exposure to hot gases.

2. The airbag as recited in claim 1, having a hot-gas intake and wherein the vicinity of the hot-gas intake is coated with a textile or knit with a surface that carbonizes.

3. The airbag as recited in claim 1, wherein the textile or knit is made entirely of fibers with a solid spun core with fluffy monofilaments, constituting the part that carbonizes, extending out of it.

4. The airbag as recited in claim 1, wherein the textile or knit contains at least some carbonizing fibers.

5. The airbag as recited in claim 1, wherein the textile or knit is a non-woven that will carbonize.

6. The airbag as recited in claim 1, wherein the carbonizing textile or knit improves the airbag's resistance to total combustion by at least 20 percent.

* * * * *